United States Patent [19]

Park

[11] Patent Number: 5,682,371

[45] Date of Patent: Oct. 28, 1997

[54] TRAY FEEDING APPARATUS OF AN OPTICAL DISC PLAYER HAVING A GUIDE UNIT FOR STABLY FEEDING A DISC TRAY

[75] Inventor: Jun-Hyun Park, Seoul, Rep. of Korea

[73] Assignee: Daewoo Electronics, Co., Ltd., Seoul, Rep. of Korea

[21] Appl. No.: 567,475

[22] Filed: Dec. 5, 1995

[30] Foreign Application Priority Data

Dec. 5, 1994 [KR] Rep. of Korea .............. 94-32757

[51] Int. Cl.$^6$ .......................... G11B 33/02; G11B 17/04
[52] U.S. Cl. .......................... 369/77.1; 369/191
[58] Field of Search .......................... 369/36, 37, 75.1, 369/77.1, 178, 192, 191; 360/96.5

[56] References Cited

U.S. PATENT DOCUMENTS

| | | | |
|---|---|---|---|
| 5,008,766 | 4/1991 | Chigasaki | 360/96.5 |
| 5,103,437 | 4/1992 | Kawakami | 369/36 |
| 5,123,001 | 6/1992 | Nakamichi et al. | 369/36 |
| 5,210,728 | 5/1993 | Noguchi et al. | 369/36 |
| 5,446,706 | 8/1995 | Naito | 369/36 |

*Primary Examiner*—Stuart S. Levy
*Assistant Examiner*—George J. Letscher
*Attorney, Agent, or Firm*—Fish & Richardson, P.C.

[57] ABSTRACT

A tray feeding apparatus of an optical disc player capable of stable back and forth feeding operations without rolling side to side, which includes a pair of guide units having a predetermined length formed by vertically piercing through a rear end of a tray, a lead screw rotatably installed to an upper plane of a base plate on a rear side of a tray receiving part within a player main body such that one end thereof is meshed with a shaft gear of a feeding motor to be driven in a prescribed direction by a rotational direction of the feeding motor, and has screw portions in the reverse direction to each other along both outer peripheries of the left and right sides centering about a center line thereof, and a tray feeding unit having a front end fitted into the guide units in the tray and a rear end fitted to the left and right screw portions of the lead screw for linearly moving the tray back and forth with respect to the player main body while the front end and rear end become close to or distant from the center of the guide units and lead screw upon the supply of a motive power.

8 Claims, 5 Drawing Sheets

5,682,371

TRAY FEEDING APPARATUS OF AN OPTICAL DISC PLAYER HAVING A GUIDE UNIT FOR STABLY FEEDING A DISC TRAY

BACKGROUND OF THE INVENTION

1. Field of the Invention

The present invention relates to a tray feeding apparatus of an optical disc player, and more particularly to a tray feeding apparatus capable of performing a stable feeding operation in an optical disc player adopting a front loading system.

2. Description of the Prior Art

Optical disc player functions for recording/reproducing information on/from a disc which enables optical recording. There are several methods for loading/unloading the disc to/from the optical disc players. Among these, as disclosed in U.S. Pat. No. 4,862,445 issued to Sasaki and U.S. Pat. No. 5,434,839 issued to Choi, a disc loading apparatus of a front loading system has been widely utilized, in which, after a tray carrying the disc thereon is horizontally moved into the interior of the player, the disc is vertically loaded on a turntable.

As illustrated in FIG. 1, the tray adopted to the optical disc player of the front loading system is transferred to the front of a player main body 18 to carry the disc thereon, and then transferred to the interior of player main body 18, thereby allowing the disc to be mounted on a turntable. A disc carrying section 12 for selectively mounting the optical disc of different sizes thereon is formed to a frontal upper plane of tray 20 to be stepped with respect to the upper surface of tray 20. A turntable guide hole 14 is formed in the center of disc carrying section 12. A pickup guide groove 16 is formed along the rear portion successive to turntable guide hole 14. A rack gear is formed to one bottom side of tray 20 along the lengthwise direction to be meshed with a feeding pinion which is one element in a loading apparatus installed to a base plate within player main body 18, so that tray 20 is loaded/unloaded back and forth.

FIG. 2 is a sectional view for showing the tray feeding apparatus of the conventional optical disc player.

In the optical disc player of the above-described front loading system, the back and forth feeding operation of the tray is attained by the elements as shown in FIG. 2. First, on a predetermined position of a base plate 10, a feeding motor 13 which is driven clockwise or counter-clockwise in accordance with a supplied signal is provided. A decelerating gear group 15 for decelerating the rpm of feeding motor 13 down to a reasonable rpm is mechanically coupled with feeding motor 13. A feeding pinion 19, is installed onto a rotating shaft 17 which is meshed with any one gear in decelerating gear group 15 to rotate by as many as the decelerated rpm in its original position. A rack gear 22 linearly moved back and forth under the state of being meshed with feeding pinion 19 when feeding pinion 19 performs the positioning rotation in the original position is formed in the lengthwise direction to one lower side of tray 20 which is joined from an upper direction of base plate 10. Guide ribs 26 are formed to both sides 24a and 24b of base plate 10 in a predetermined height in the back and forth. Also, guide grooves 28 are formed at both sides of tray 20 corresponding to guide ribs 26 are formed. Thus, base plate 10 and tray 20 are fitted to each other.

Consequently, together with the rotation of feeding motor 13, feeding pinion 19 interlocked thereto performs the positioning rotation. Successively, rack gear 22 meshed with feeding pinion 19 and integrally formed to one side of tray 20 is transferred backward or forward. Therefore, tray 20 is transferred backward or forward to perform the loading or unloading operations.

In the tray feeding apparatus of the conventional optical disc player constructed as above, a force is disproportionately applied because the motive power is transmitted when rack gear 22 and feeding pinion 19 on tray 20 are coupled to each other in only one direction. As the result, even though the guide structure coupled between base plate 10 and tray 20 is formed, a side-to-side floating is caused during the back and forth feeding operations of tray 20 due to a tolerance inevitably appearing in the guide structure.

Furthermore, in the conventional tray feeding apparatus, feeding pinion 19 and rack gear 22 on tray 20 are meshed only at one side. Therefore, it is highly likely that rack gear 22 will deviate out of the meshing engagement with feeding pinion 19 when a lo side shock is externally applied.

SUMMARY OF THE INVENTION

The present invention has been devised to solve the foregoing problems. Therefore, it is an object of the present invention to provide a tray feeding apparatus of an optical disc player of a new pattern, wherein back and forth feeding operations of a tray is stably performed without rolling side to side, and a rack gear on the tray is not separated from the meshing engagement with a feeding pinion free from an externally-imposed side shock in an optical disc player of a front loading system, thereby enhancing stability of the operation and reliability of the product.

To achieve the above object of the present invention, there is provided a tray feeding apparatus of an optical disc player. Here, a pair of guide units has a predetermined length formed by vertically piercing through a rear end of a tray, and a lead screw is rotatably installed to an upper plane of a base plate on a rear side of a tray accommodating part within a player main body, of which one end is meshed with a shaft gear of a feeding motor to be driven in a prescribed direction by a rotational direction of the feeding motor. Also, screw portions in the reverse direction to each other are provided to the lead screw along both outer peripheries of the right and left sides centering about a center line thereof. Furthermore, a tray feeding unit has a front end fitted into the guide units in the tray and a rear end fitted to the left and right screw portions of the lead screw for linearly moving the tray backwards or forwards with respect to the player main body while the front end and rear end become near toward or distant from the center of the guide units and lead screw upon the supply of a motive power.

At this time, it is preferable that the guide units are elongated guide holes, and the lead screw is rotatably installed to an upper plane of the base plate by means of brackets.

More specifically, the tray feeding unit includes cylindrical screws fitted to be screw-coupled with both left and right sides of the lead screw are simultaneously close to or distant from the center in accordance with the positioning rotating direction of the lead screw, and a cross link of which both rear ends are hingeally coupled to outer peripheries of the cylindrical screws and both front ends are formed with up-and-down coupling plates having thruholes in the centers. The cross link can be simultaneously folded and unfolded backward and forward while being transferred side to side in accordance with the side-to-side transferring operation of the cylindrical screws. In addition to these, feed rollers have upper ends and lower ends fitted into the coupling plates on the cross link under the state of being inserted to the elongated guide holes in the tray for pushing or pulling the tray while being transferred side to side along the guide units in the tray in accordance with the folding and unfolding operations of the cross link.

More specifically, a directing unit is further provided to both sides of the tray and both sidewalls of the tray accommodating part corresponding to the sides of the tray for stably performing the backward and forward operations of delivering the tray. Here, the directing unit includes guide rod mounting brackets which are fixed to both corners of the rear end of the tray by means of screws, and integrally formed with guide rod receiving bosses to the inner sides at outer ends thereof for being fitted with both ends of guide rods. Also, guide-rod directing bosses are embedded from predetermined positions of both inner sides of the tray accommodating part for directing the backward and forward feeding operations when fitted with the guide rods fixedly installed to both sides of the tray.

The cross link numbers one, or is formed of a plurality of units in repeating stages, as required.

The length of the elongated guide holes and screw portions is at least the same as the feeding distance of the tray, and it is acceptable to be longer than the feeding distance.

The tray feeding apparatus of the optical disc player according to the present invention is constructed to be transferred backward and forward with respect to the player main body by the swing operation of the lead screw and folding/unfolding operations of the cross link coupled to the lead screw. By this construction, the side-to-side rolling while performing the feeding operation is decreased, and the force exerted upon the tray is consistently applied from the rear side of the tray to rarely cause noise. Furthermore, even though an external shock is applied, the tray is not separated from the feed mechanism, thereby stabilizing the operation thereof.

BRIEF DESCRIPTION OF THE DRAWINGS

The above object and other advantages of the present invention will become more apparent by describing in detail preferred embodiments thereof with reference to the attached drawings in which.

DETAILED DESCRIPTION OF THE PREFERRED EMBODIMENT

A structure and operational principle of a tray feeding apparatus of an optical disc player according to the present invention will be described in detail with reference to the accompanying drawings.

Figure 1:
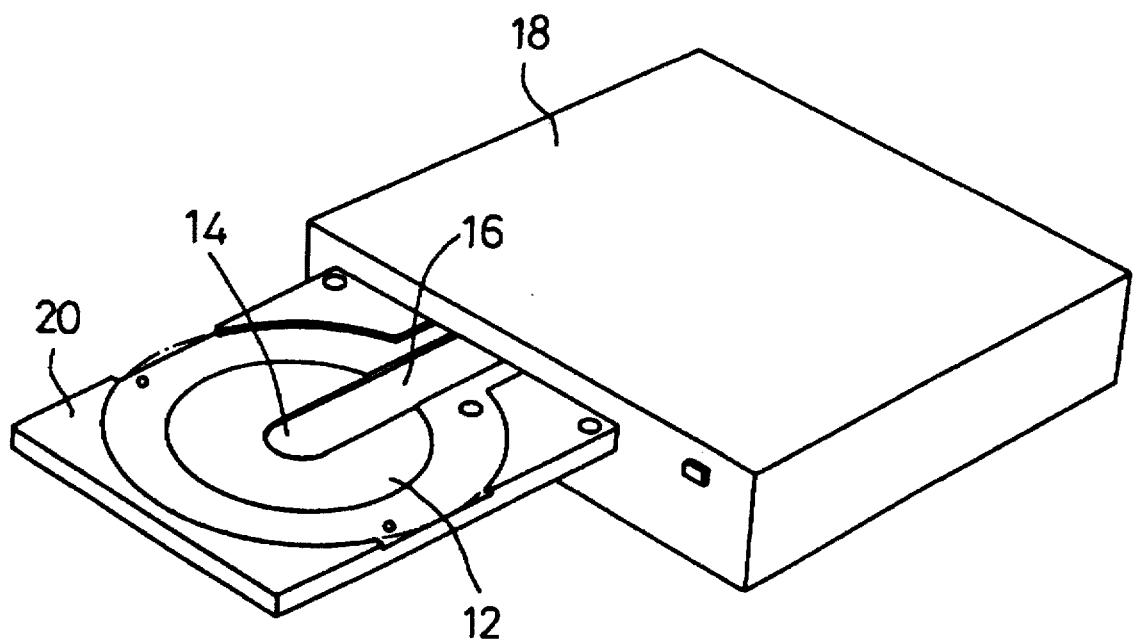
FIG. 1 is a perspective view for showing a tray being drawn out to the front of a player main body in the conventional optical disc player.
Figure 2:
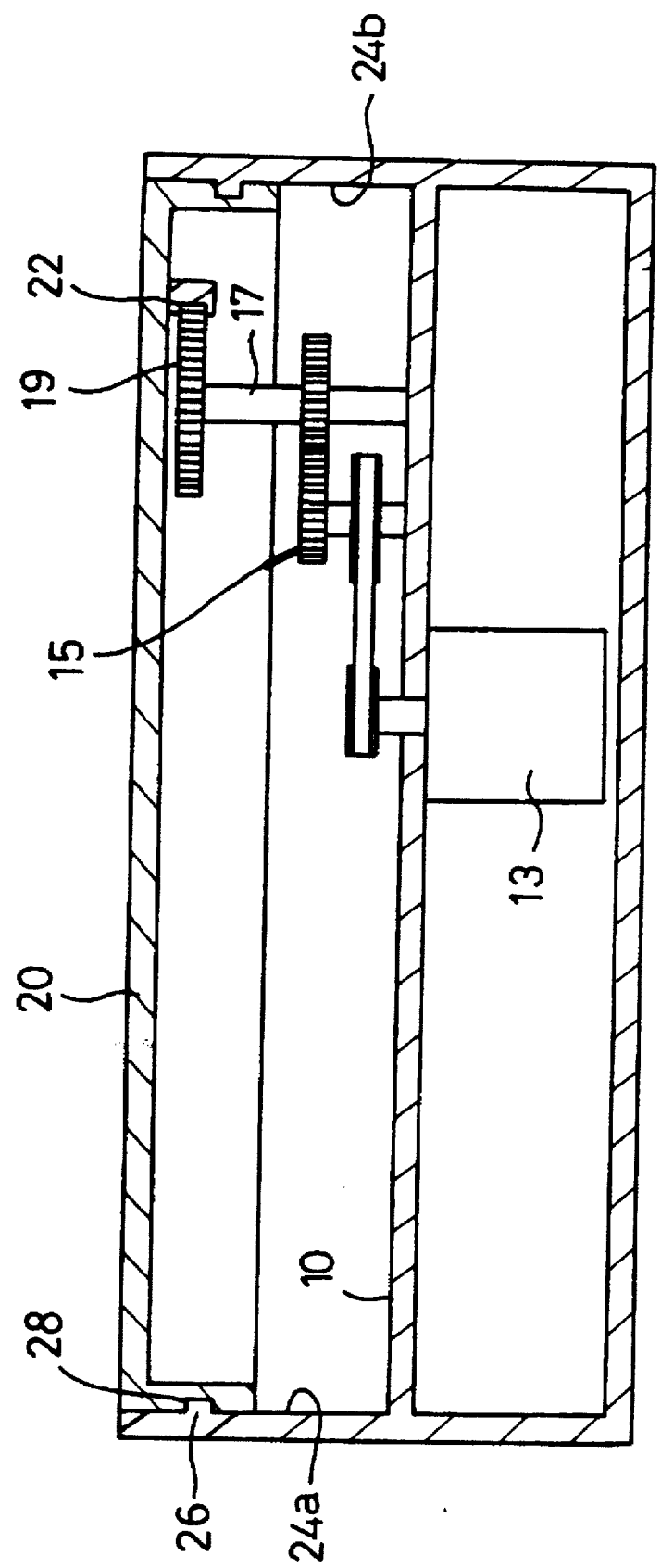
FIG. 2 is a sectional view for showing the tray feeding apparatus in the conventional optical disc player.
Figure 3:
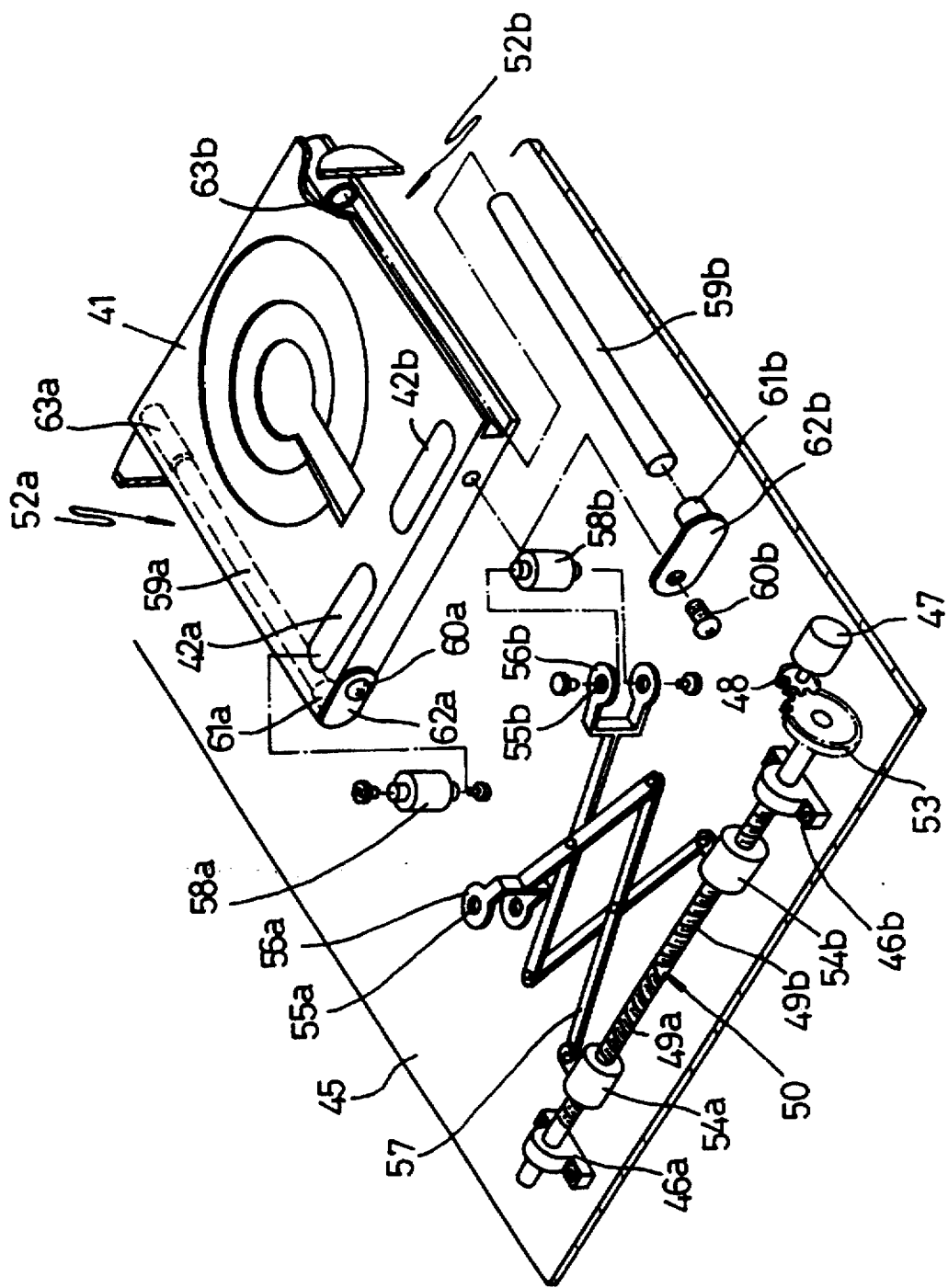
FIG. 3 is an exploded perspective view for showing a tray feeding apparatus of an optical disc player according to one embodiment of the present invention.

FIG. 3 is an exploded perspective view for showing the tray feeding apparatus of the optical disc player according to one preferred embodiment of the present invention.

A pair of left and right, first and second elongated guide holes 42a and 42b having a predetermined length are formed in a rear end of a tray 41 to vertically penetrate in the same central line. A lead screw 50 having one end meshed with a shaft gear 48 of a feeding motor 47 to be driven by the rotation of feeding motor 47 is provided on an upper plane of a base plate 45 on a rear side of a tray receiving part within a player main body, while being installed by first and second brackets 46a and 46b to be rotatable, in which first and second screw portions 49a and 49b are formed in reverse direction to each other along outer peripheries of both sides of lead screw 50 centering about a center line. A cross link 57 has a front end fitted to be coupled with first and second elongated guide holes 42a and 42b on tray 41 and a rear end fitted to be coupled with first and second screw portions 49a and 49b of lead screw 50. First and second guide units 52a and 52b for stably performing the back and forth feeding operations of tray 41 are provided to both sides of tray 41 and both sidewalls of tray receiving part 44 corresponding to the both sides of tray 41.

Hereinbelow, the structure and operation of the above-mentioned elements will be described in detail.

A pair of first and second brackets 46a and 46b are screw-coupled onto an upper plane of base plate 45 at the rear side of tray receiving part 44 in player main body 43. Lead screw 50 rotatably installed by first and second brackets 46a and 46b has one end meshed with shaft gear 48 of feeding motor 47 to be driven in the forward or reverse direction in accordance with the rotating direction of feeding motor 47. A transmission gear 53 meshed with shaft gear 48 is fixedly coupled with one end of lead screw 50 to transfer the driving by the rotation of feeding motor 47 to lead screw 50. Lead screw 50 is provided with first and second screw portions 49a and 49b in opposite direction to each other along the outer periphery of the left and right sides thereof centering about the center line.

Cross link 57 is connected to lead screw 50, of which the rear end is fitted to be coupled with left and right screws 49a and 49b of lead screw 50 by means of first and second cylindrical screws 54a and 54b, and front end of cross link 57 is fitted to be coupled with first and second elongated guide holes 42a and 42b in tray 41 by means of first and second feeding guide rollers 58a and 58b.

When first and second cylindrical screws 54a and 54b are screw-coupled by inserting to first and second screw portions 49a and 49b of lead screw 50 formed in the reverse direction to each other, first and second cylindrical screws 54a and 54b simultaneously become close to the center or distant therefrom in accordance with the positioning rotation of lead screw 50, in which both rear ends of cross link 57 are hingedly coupled to the outer peripheries of first and second cylindrical screws 54a and 54b. Cross link 57 is folded or unfolded backward and forward, while being transferred side to side in accordance with the side-to-side feeding operation of first and second cylindrical screws 54a and 54b. First and second up-and-down coupling plates 56a and 56b having first and second holes 55a and 55b are integrally formed with cross link 57 by being bent from ends thereof. When cross link 57 is inserted into first and second elongated guide holes 42a and 42b in tray 41, it is joined with tray 41 by means of first and second feeding guide rollers 58a and 58b which are to be transferred side to side along first and second elongated guide holes 42a and 42b by permitting upper and lower ends to fit into first and second up-and-down coupling plates 56a and 56b in cross link 57 in accordance with the folding and unfolding operations of cross link 57.

Consequently, cross link 57 is folded or unfolded while lead screw 50 having one end meshed with shaft gear 48 of feeding motor 47 is rotated in a predetermined direction along with the driving of feeding motor 47 to be close to or distant from the center of first and second elongated guide holes 42a and 42b in the front end and lead screw 50 on the rear end, thereby serving for linear moving of tray 41 back and forth with respect to player main body 43. In FIG. 3, the cross link is formed to have two units, in which the repeating unit can be selectively provided, as required.

The pair of first and second elongated guide holes 42a and 42b of the predetermined length are formed in the rear end of try 41, while vertically penetrating about the same center line. First and second elongate guide holes 42a and 42b for accepting first and second feeding guide rollers 58a and 58b are long enough to be at least the same or longer than the moving distance of tray 41 when cross link 57 is folded or unfolded.

First and second guide units 52a and 52b are provided to both sides of tray 41 and both sidewalls of tray receiving part 44 corresponding to the sides of tray 41 for stably performing the back and forth feeding operations of tray 41.

Here, first and second guide units 52a and 52b include first and second guide rods 59a and 59b. Further, first and second guide rod mounting brackets 62a and 62b integrally formed with first and second guide rod inserting bosses 61a and 61b for being fitted with ends of first and second guide rods 59a and 59b by screws 60a and 60b are installed to both rear corners of tray 41. In addition, first and second guiderod directing bosses 63a and 63b are embedded from predetermined positions of both inner surfaces of tray receiving part 44 to be fixedly installed to both sides of tray 41, thereby directing to lead first and second guide rods 59a and 59b back and forth by being inserted with the guide rods.

The operation of receiving and delivering the disc by the tray feeding apparatus according to the present invention having the above-described elements will be described with reference to FIGS. 4 and 5.

Figure 4:
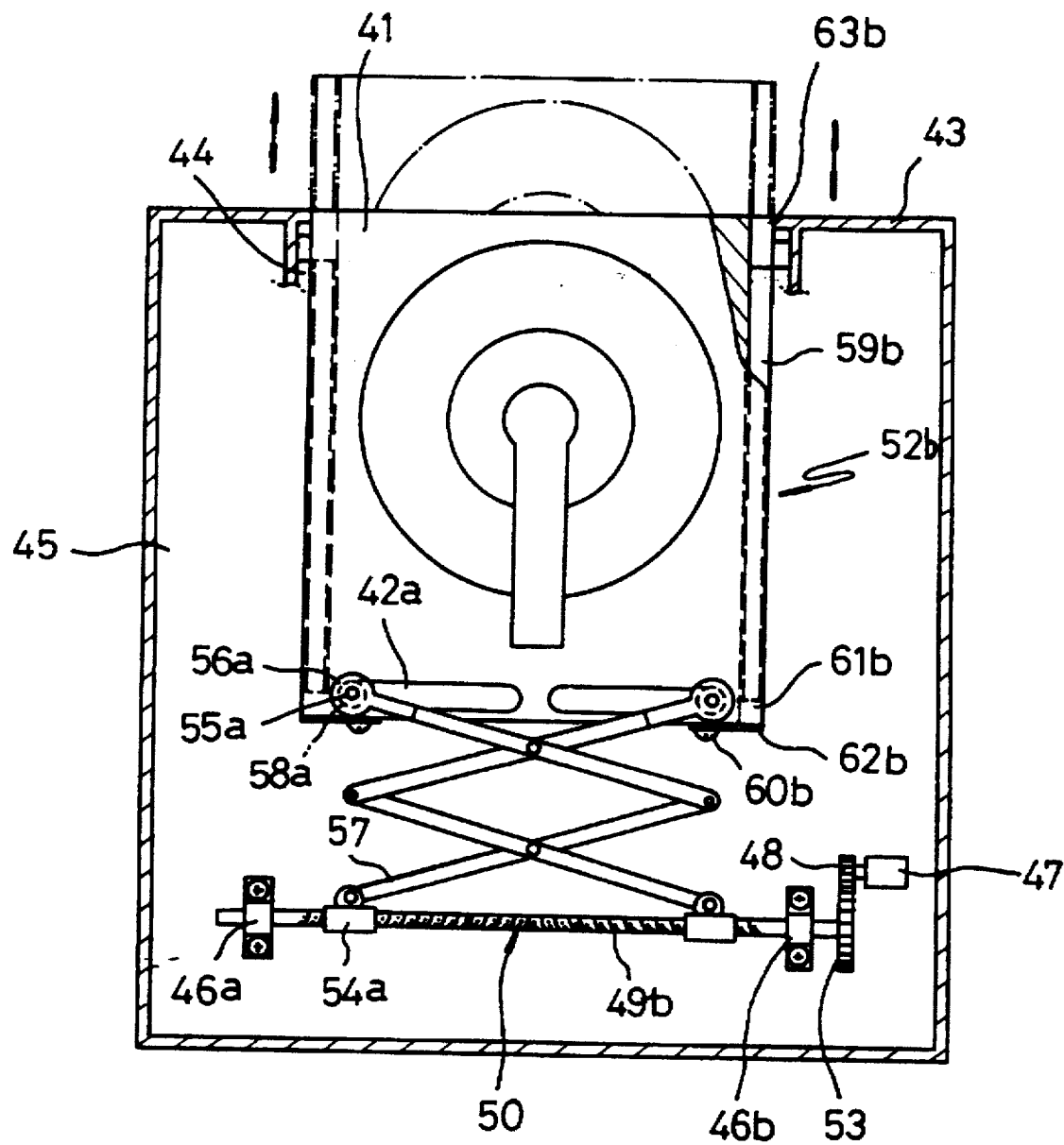
FIG. 4 is a plan view for showing the tray feeding apparatus of the optical disc player of FIG. 3 being received within the player main body.

FIG. 4 is a plan view for showing the tray being received within the player main body.

If a user presses a tray back-feed switch when the tray has been transferred forward, feeding motor 47 is rotated in the predetermined direction, and lead screw 50 having one end meshed with shaft gear 48 of feeding motor 47 is rotated in a preset direction. By this operation, first and second cylindrical screws 54a and 54b fitted by lead screw 50 are widened toward both ends from the center of lead screw 50. Therefore, cross link 57 having both rear ends coupled to the outer peripheries of first and second cylindrical screws 54a and 54b is widened toward both sides to be backwardly folded to the maximum extent. At the same time, first and second feeding guide rollers 58a and 58b coupled to the front end of cross link 57 are moved outward of first and second elongated guide holes 42a and 42b in tray 41 to force whole tray 41 to be accommodated within play main body 43.

Figure 5:
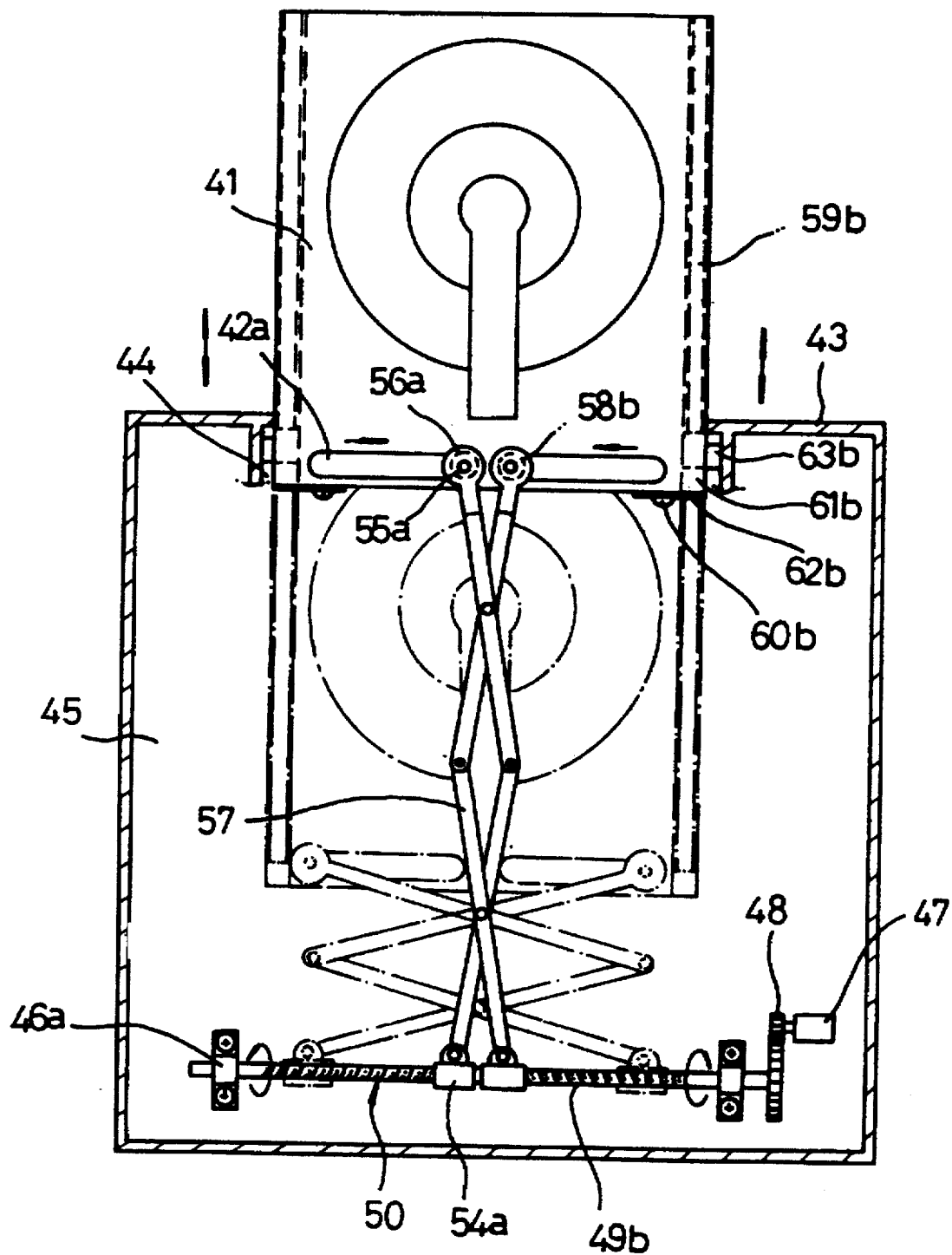
FIG. 5 is a plan view for showing the tray feeding apparatus of the optical disc player of FIG. 3 being transferred to the front of the player main body.

FIG. 5 is a plan view for showing the tray feeding apparatus being transferred to the front of the player main body.

If the user presses a tray forth-feed switch for mounting or exchanging the disc under the state as shown in FIG. 4, feeding motor 47 is rotated in the reverse direction to that of FIG. 4. As shown in FIG. 5, in connection with this operation, lead screw 50 having one end brought into messing engagement with shaft gear 48 of feeding motor 47 by means of transmission gear 53 is rotated in the preset direction. Accordingly, first and second cylindrical screws 54a and 54b are simultaneously moved close to the center of lead screw 50, and cross link 57 having the rear end hingeally coupled to the outer peripheries of first and second cylindrical screws 54a and 54b is drawn about the center to be unfolded.

When cross link 57 is drawn about the center while being unfolded, first and second feeding guide rollers 58a and 58b coupled to first and second coupling plates 56a and 56b on both ends of cross link 57 and simultaneously inserted to first and second elongated guide holes 42a and 42b in tray 41 are linearly moved from the outer side to the inner side along first and second elongated guide holes 42a and 42b. As the result, whole tray 41 is transferred to the front, i.e., delivered to the outside of player main body 43.

If tray 41 is delivered forward through the above-stated operation, first and second guide rods 59a and 59b fixedly installed to both sides of tray 41 are linearly moved when inserted in first and second guide-rod directing bosses 63a and 63b fixedly formed to both inner sidewalls of tray 41, so that the probable occurrence of the side-to-side rolling of tray 41 is significantly decreased.

As described above, when the user presses the tray-back feed switch again after mounting or exchanging the disc by forwardly delivering tray 41 in the front of player main body 43, feeding motor 47 is driven in the opposite direction of the forward feeding operation. By doing so, lead screw 50, first and second cylindrical screws 54a and 54b, cross link 57 and first and second feeding guide rollers 58a and 58b are operated in the reverse direction to the forward feeding operation. Therefore, tray 41 is again received within tray receiving part 44 as shown in FIG. 4.

The tray feeding apparatus according to the present invention constructed as above is transferred forward and backward with respect to the player main body by the swing operation of the lead screw and folding/unfolding operations of the cross link coupled to the lead screw to involve no side-to-side rolling while performing the feeding operation. Furthermore, the force exerted upon the tray is consistently applied from the rear side of the tray to rarely cause a noise. In addition, even though an external shock is applied, the tray is not separated from the feed mechanism, thereby enhancing stability of the operation and reliability with respect to the product.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A tray feeding apparatus of an optical disc player having a player main body, a tray with a rear end, formed on a tray receiving post with a rear side, and driven by a feeding motor that drives a shaft gear, comprising:

a pair of elongated guide holes having a predetermined length formed by vertical piercing through the rear end of the tray;

a lead screw rotatably installed to an upper plane of a base plate on the rear side of the tray receiving part within the player main body, said lead screw having one end meshed with the shaft gear of the feeding motor, to be driven in a prescribed direction by a rotational direction of the feeding motor, and said lead screw having first and second screw portions in reverse direction to each other along both outer peripheries of said first and second screw portions centering about a center line of said first and second screw portions; and tray feeding means having a front end fitted into said elongated guide holes in said tray and a rear end fitted to said first and second screw portions of said lead screw for linearly moving said tray back and forth with respect to the player main body while said front end becomes close to or distant from the center of said elongated guide holes and lead screw, respectively upon the supply of a motive power, wherein said tray feeding means comprises:

first and second cylindrical screws fitted to be screw-coupled with both said first and second screw portions of said lead screw, said first and second cylindrical screws simultaneously moving closer to or more distant from a center of said lead screw in accordance with the rotating of said lead screw;

a cross link having both rear ends hingedly coupled to outer peripheries of said first and second cylindrical screws, and both front ends with up-and-down coupling plates having holes in the centers, and capable of being folded and unfolded back and forth, while it is transferred side to side in accordance with the side-to-side transferring operations of said first and second cylindrical screws; and feeding rollers having upper ends and lower ends fitted into said coupling plates in said cross link when inserted into said elongated guide holes in said tray for pushing or pulling said tray while it is transferred side to side along said guide means in said tray in accordance with the folding and unfolding operations of said cross link.

2. A tray feeding apparatus of an optical disc player as claimed in claim 1, wherein said lead screw is rotatably installed to an upper plane of said base plate by means of brackets.

3. A tray feeding apparatus of an optical disc player as claimed in claim 1, wherein said cross link is comprised of a plurality of repeating units.

4. A tray feeding apparatus of an optical disc player as claimed in claim 1, wherein the length of said elongated guide hole is the same as the feeding distance of said tray.

5. A tray feeding apparatus of an optical disc player as claimed in claim 1, wherein the length of said screw portion is the same as said feeding distance of said tray.

6. A tray feeding apparatus of an optical disc player as claimed in claim 1, wherein said up-and-down coupling plates are bent from said cross link in a body.

7. A tray feeding apparatus of an optical disc player that has a tray within a player main body comprising:

a pair of elongated guide Holes having a predetermined length formed by vertically piercing through a rear end of a tray;

a lead screw rotatably installed by brackets to an upper plane of a base plate corresponding to a rear side of a tray receiving part within the player main body, said lead screw having one end meshed with a shaft gear of a feeding motor to be driven in a predetermined direction by a rotational direction of said feeding motor, and said lead screw having first and second screw portions in the reverse direction to each other along both outer peripheries of the first and second screw portions centering about a center line thereof;

tray feeding means including first and second cylindrical screws fitted to be screw-coupled with both the first and second screw portions of said lead screw for being moved close to or distant from said center in accordance with the positioning rotating direction of said lead screw, a cross link of plural units having both rear ends coupled to outer peripheries of said first and second cylindrical screws and both front ends integrally formed with bent up-and-down coupling plates having holes in the centers, said cross link being capable of being folded and unfolded back and forth, while being transferred side to side in accordance with the side-to-side transferring operation of said cylindrical screws upon the supply of a motive power, and feed rollers having upper ends and lower ends fitted into said coupling plates on said cross link when inserted to said elongated guide holes in said tray for pushing or pulling said tray while being transferred side to side along said guide holes in said tray in accordance with the folding and unfolding operations of said cross link; and directing means installed to both sides of said tray and both sidewalls of said tray receiving part corresponding to the sides of said tray for stably performing the back and forth operations of said tray.

8. A tray feeding apparatus of an optical disc player as claimed in claim 7, wherein said directing means comprises:

guide rod mounting brackets fixed to both corners of the rear end of said tray by means of screws, and integrally formed with guide rod receiving bosses to the inner sides at outer ends thereof for being fitted with both ends of guide rods; and guide-rod directing bosses embedded from predetermined positions of both inner sides of said tray receiving part for directing the backward and forward feeding operations when fitted with said guide rods fixedly installed to both sides of said tray.

\* \* \* \* \*